US005606237A

United States Patent [19]

Biasotti et al.

[11] Patent Number: 5,606,237

[45] **Date of Patent: *Feb. 25, 1997**

[54] INDUCTIVE COUPLER CHARACTERISTIC SHAPE

[75] Inventors: Mark Biasotti, San Jose; Russell M. Abbott, Riverside; George R. Woody, Redondo Beach, all of Calif.

[73] Assignee: Delco Electronics Corp., Kokomo, Ind.

[ * ] Notice: The term of this patent shall not extend beyond the expiration date of Pat. No. 5,457,378.

[21] Appl. No.: 237,559

[22] Filed: Apr. 29, 1994

[51] Int. Cl.$^{6}$ .................................................... H01M 10/46

[52] U.S. Cl. .................................................................... 320/2

[58] Field of Search ............... 320/2, 5, 21; 336/DIG. 2, 336/82, 83, 66

[56] References Cited

U.S. PATENT DOCUMENTS

| | | | |
|---|---|---|---|
| 5,216,402 | 6/1993 | Carosa | 336/83 X |
| 5,327,065 | 7/1994 | Bruni et al. | 320/2 |
| 5,379,021 | 1/1995 | Ito et al. | 336/83 |
| 5,412,304 | 5/1995 | Abbott | 320/2 |
| 5,434,493 | 7/1995 | Woody et al. | 320/2 |
| 5,457,378 | 10/1995 | Woody | 320/2 X |
| 5,506,489 | 4/1996 | Abbott et al. | 320/2 X |

*Primary Examiner*—Edward H. Tso
*Attorney, Agent, or Firm*—Mark A. Navarre

[57] ABSTRACT

An inductive charging coupler for use in an inductive charging apparatus used to charge a battery. The charging coupler is insertable into a charge port that is coupled to the battery. The charge port comprises a housing, an opening into which the charging coupler is inserted, and a ferrite core surrounded by secondary windings. The charging coupler comprises a housing having a hollow disk-shaped section with substantially flat opposed surfaces and a tapered handle extending therefrom. An opening is disposed through each of the flat opposed surfaces. A center magnetic core is disposed in the opening and has opposed flat surfaces that are substantially coplanar with the substantially flat opposed surfaces of the housing. A primary winding is disposed in the hollow disk-shaped section around the center magnetic core. The coupler has the shape of a paddle and is designed to give a vehicle operator a sense of safety when transferring electric power to the battery of an electric vehicle, for example.

12 Claims, 2 Drawing Sheets

20
22a
22b
23
28
29
31
30
32
26
29
33
34
24
POWER SOURCE
27
25

INDUCTIVE COUPLER CHARACTERISTIC SHAPE

BACKGROUND

The present invention relates to inductive chargers, and more particularly, to inductive charging apparatus having an inductive coupler that has a predetermined disc shape.

The assignee of the present invention designs, develops and manufactures inductive charging systems for use in charging electric batteries of electric vehicles, and the like. The assignee of the present invention has developed a fixed core charging system. This charging system employs a charge port comprising secondary windings and core that form a secondary of a transformer installed in an electric vehicle, and a charge coupler or probe comprising a primary winding and a core that form a primary of a transformer that is coupled to a power source and which is inserted into the charge port to charge the vehicle batteries.

The prior art relating to vehicle charging apparatus relate to systems that transfer electric power by using galvanic type contacts that have reliability concerns such as corrosion and pitting. The present coupler has a characteristic disc shape and uses inductive coupling which does not use galvanic contacts to transfer electric power.

It is therefore an objective of the present invention to provide for an inductive charging coupler having a predetermined disc shape.

SUMMARY OF THE INVENTION

In order to meet the above and other objectives, the present invention is an electromagnetically shielded inductive charging apparatus for use in charging a propulsion battery of an electric vehicle, for example. The inductive charging apparatus comprises an inductive charging coupler and a charge port disposed in the electric vehicle that is coupled to a propulsion battery of the electric vehicle. The charging coupler comprises a center magnetic (ferrite) core, or disk, and a primary winding disposed around the center magnetic core. The exterior surfaces of the core and primary winding are flat and substantially parallel to each other. The shape of the core and primary winding is generally circular, thus forming a flat disk. A charger cable is coupled between the primary winding and an external power source for coupling energy to the charging coupler.

A plastic coupler housing is provided that has two mating coupler halves that are configured to provide a handle, and the mating coupler halves enclose the primary winding and the center magnetic core, and secures the charger cable in the handle. A conductive plastic strip may be disposed along an exterior portion of the coupler between the handle and the primary winding. The coupler housing has a tapered cross section is a direction towards the handle. The handle is thus thicker than the area of the coupler adjacent the primary winding and core. The handle also tapers laterally so that the handle is wider than the area of the coupler adjacent the primary winding and core. The coupler may also have two indentations along its respective sides that mate with two projecting fingers extending from the charge port, that provide a tactile feel for a user when it is inserted into the charge port.

More specifically, the coupler housing comprises a hollow disk-shaped section having substantially flat opposed surfaces and the tapered handle extends from the disk section. An opening is disposed through each of the flat opposed surfaces of the hollow disk-shaped section. The center magnetic core is disposed in the opening and has opposed flat surfaces that are substantially coplanar with the substantially flat opposed surfaces of the housing.

The inductive charging apparatus provides a means for transferring electric power to the vehicle propulsion battery, for example, by means of inductive coupling. The shape of the coupler is designed to be esthetically pleasing and functional. The shape of the primary coil and the ferrite disk in the disk-shaped section gives the coupler its characteristic shape.

The coupler has the shape of a paddle and is designed to give a user a sense of safety when it is used to transfer electric power to electric vehicle batteries, for example. The coupler is designed to replace plugs with exposed contacts used in direct-connection type charging systems. Since the coupler is used to transfer power inductively, copper used to transfer power is buried within the coupler. All the user sees is a plastic paddle, and this gives the user the feeling of safety.

The present coupler may be used in inductive chargers for electric vehicles. The coupler has been designed for use with a 6.6 kw charger, a 1.5 kw charger, and a 25 to 50 kw charger manufactured by the assignee of the present invention. In addition the coupler may be used with chargers that provide very high power up to 200 kw.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
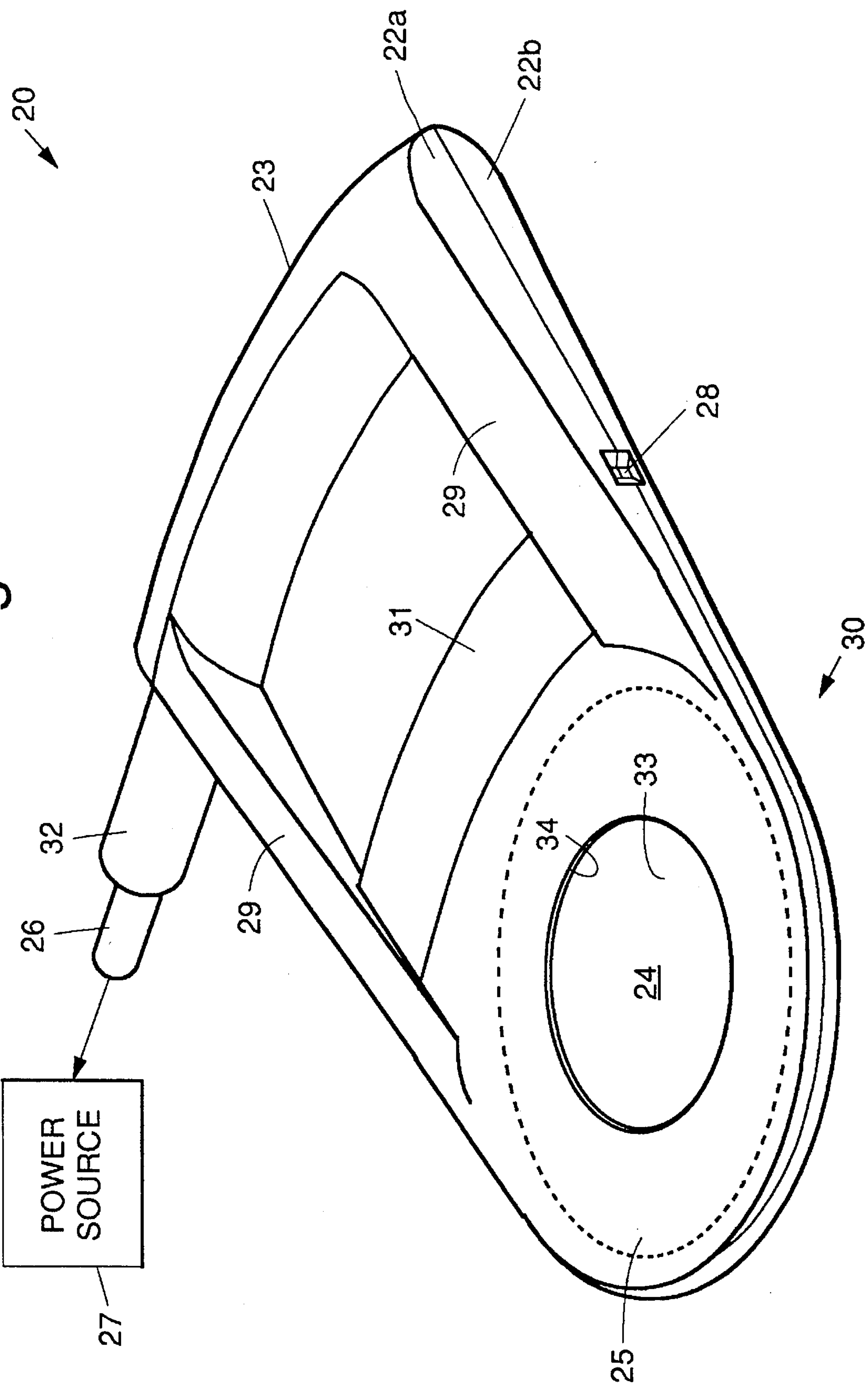
FIG. 1 illustrates a perspective view of an inductive charging coupler in accordance with the principles of the present invention.
Figure 2:
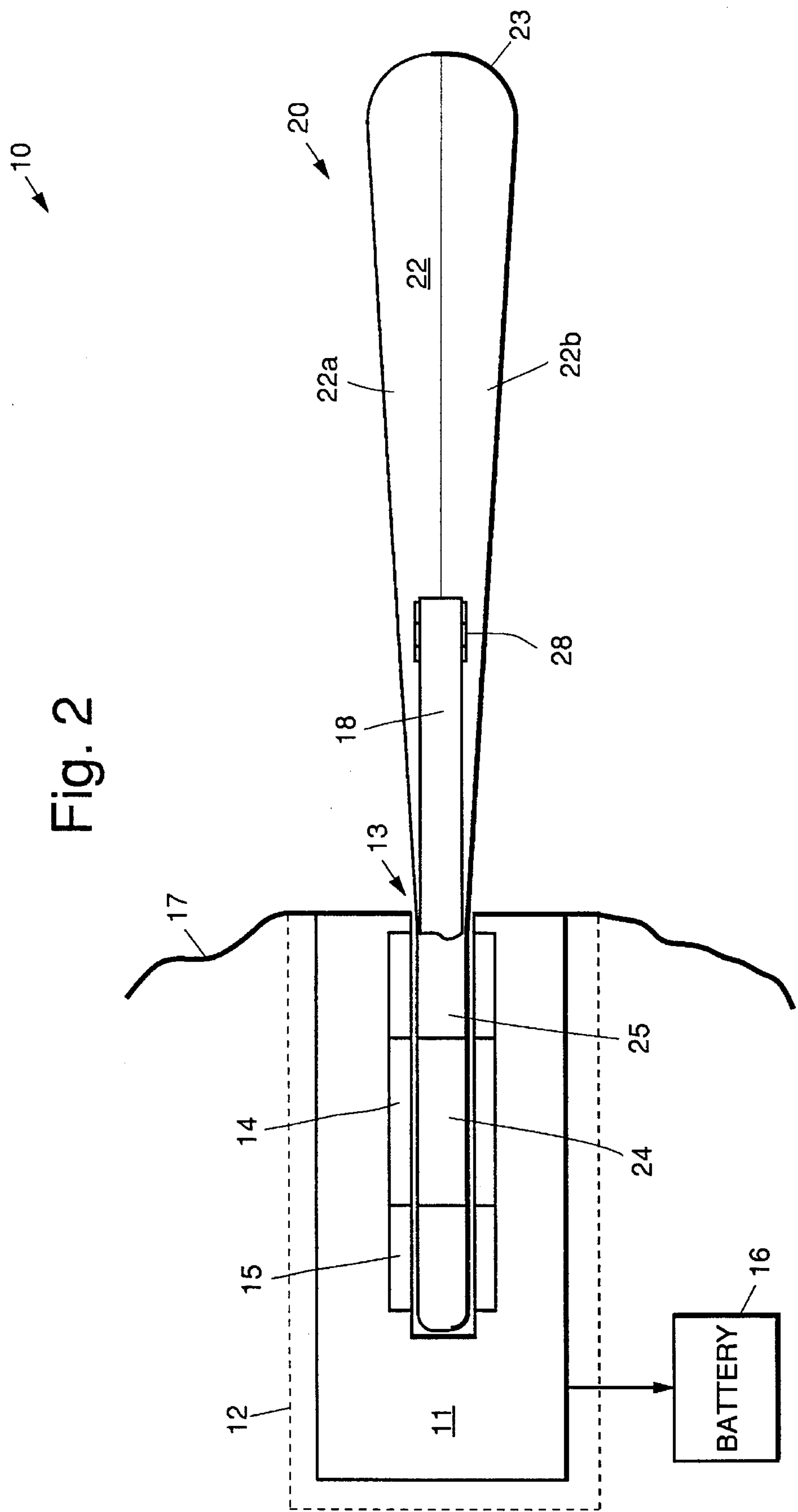
FIG. 2 is a partial cross sectional view of inductive charging apparatus that comprises the inductive charging coupler of FIG. 1 inserted into a charge port.

Referring to the drawing figures, FIG. 1 illustrates a perspective view of an inductive charging coupler 20 in accordance with the principles of the present invention, while FIG. 2 is a partial cross sectional view of inductive charging apparatus 10 that comprises the inductive charging coupler 20 of FIG. 1 inserted into a charge port 11 in an electric vehicle 12, for example.

The charge port 11 includes a housing 12 having an opening 13 into which the inductive charging coupler 20 is inserted. The charge port 11 comprises a ferrite core 14 and secondary windings 15 surrounding the core 14. The charge port 11 is coupled to a battery 16 of the electric vehicle 17 in which it is housed. The charge port 11 includes a plurality of metallized electromagnetic interference (EMI) fingers 18 that protrude into the opening 13 and that are adapted to press against the inductive charging coupler 20. The EMI fingers 17 may be comprised of tinned copper, for example.

The inductive charging coupler 20 is comprised of a plastic coupler housing 22 that has two mating coupler halves 22_a_, 22_b_ that are configured to provide a handle 23. The inductive charging coupler 20 is comprised of a center magnetic core 24 or "puck" 24, that may be comprised of ferrite, for example. A primary winding 25 is disposed around the center magnetic core 24. A charger cable 26 (FIG. 1), or other current carrying means 26, is coupled to the primary winding 25 and to an external power source 27 for coupling energy to the charging coupler 20.

More specifically, the housing 22 comprises a hollow disk-shaped section 30 having substantially flat opposed surfaces and the tapered handle extends from the disk section 30. An opening 34 is disposed through each of the flat opposed surfaces of the hollow disk-shaped section 30. The center magnetic core 24 is disposed in the opening 34 and has opposed flat surfaces that are substantially coplanar with the substantially flat opposed surfaces of the housing 22.

The charging coupler 20 is designed to be inserted into the opening 13 of the charge port 11 in order to couple current to the battery 15 from the external power source 27. The coupler has two indentations 28 along its respective sides that mate with two projecting fingers extending from the charge port, that provide a tactile feel for a user when it is inserted into the charge port.

The mating coupler halves 22*a*, 22*b* of the inductive charging coupler 20 enclose the primary winding 25 and the center magnetic core 24, and secures the charger cable 26 in the handle 23. A conductive plastic strip (that is, a plastic strip with electrically conductive material incorporated therein) 31 may be disposed along an exterior portion of the coupler 20 between the handle 23 and the primary winding 25. The conductive plastic strip 31 engages the metallized electromagnetic interference (EMI) fingers 16 when the coupler 20 is inserted into the charge port 11. A strain relief member 32 surrounds the charger cable 26 at a point where it exits the handle 23, and is secured by the two mating coupler halves 22*a*, 22*b*.

More particularly, the coupler 20 is comprised of a plastic housing 22. A disk section 30 comprising the core 24 and winding 25 has a disk shape which is attached to the handle 23, for gripping by the user, via two stems 29 that taper from the thickness of the handle 23 down to the thickness of the disk section 30. The thickness of the disk section 30 is determined by the size of the charge port opening 13 into which it is inserted. The width of the disk section 30 is shaped to fit in the charge port 11 and to prevent misalignment. The ferrite core 24 is sandwiched by the two coupler halves 22*a*, 22*b* which are joined together by means of adhesive or ultrasonic welding. The ferrite core 24 may be coated with a plastic coating 33 to blend in with the surrounding housing 22. The coupler 20 may be designed in various sizes as long as there is a mating port 11 that can accommodate that size, notably the width and the thickness of the disk section 30. The handle 23 is free to vary in thickness to accommodate higher electrical power and coolant connections, as needed.

Thus there has been described a new and improved inductive charging coupler having a predetermined disc shape. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. In an inductive charging apparatus for use in charging a battery, which apparatus comprises a charging coupler that is insertable into a charge port that is coupled to the battery, and wherein the charge port comprises a housing, an opening into which the charging coupler is inserted, and a ferrite core surrounded by secondary windings, wherein said charging coupler comprises:

a housing comprising a hollow disk-shaped section having substantially flat opposed surfaces and a tapered handle extending from the disk section, and having an opening disposed through each of the flat opposed surfaces;

a center magnetic core disposed in the opening and having opposed flat surfaces that are substantially coplanar with the substantially flat opposed surfaces of the housing;

a primary winding disposed in the hollow disk-shaped section around the center magnetic core; and a plastic strip with electrically conductive material incorporated therein disposed along an exterior portion of the coupler between the handle and the primary winding.

2. The charging coupler of claim 1 further comprising a charger cable coupled to the primary winding and coupled to an external power source for transferring energy to the charging coupler.

3. The charging coupler of claim 2 further comprising a strain relief member surrounding the charger cable at a point where it exits the handle, and that is secured by the two mating coupler halves.

4. The charging coupler of claim 2 wherein the housing comprises plastic coupler housing that has two mating halves that are configured to form the handle, and wherein the mating halves enclose the primary winding and the center magnetic core, and secures the charger cable in the handle.

5. The charging coupler of claim 1 wherein the center magnetic core is comprised of ferrite.

6. In an inductive charging apparatus for use in charging a battery, which apparatus comprises a charging coupler that is insertable into a charge port that is coupled to the battery, and wherein the charge port comprises a housing, an opening into which the charging coupler is inserted, and a ferrite core surrounded by secondary windings, wherein said charging coupler comprises:

a housing comprising a hollow disk-shaped section having substantially flat opposed surfaces and a tapered handle extending from the disk section, and having an opening disposed through each of the flat opposed surfaces;

a center magnetic core disposed in the opening and having opposed flat surfaces that are substantially coplanar with the substantially flat opposed surfaces of the housing;

a primary winding disposed in the hollow disk-shaped section around the center magnetic core; and a plurality of indentations disposed along its respective sides that mate with two projecting fingers extending from the charge port, that provide a tactile feel for a user when it is inserted into the charge port.

7. The charging coupler of claim 6 wherein said charge port further comprises a plurality of metallized electromagnetic interference fingers that protrude into the opening and mate with the plurality of indentations in the sides of the charging coupler.

8. The charging coupler of claim 7 wherein the electromagnetic interference fingers are comprised of tinned copper.

9. The charging coupler of claim 6 further comprising a charger cable coupled to the primary winding and coupled to an external power source for transferring energy to the charging coupler.

10. The charging coupler of claim 9 further comprising a strain relief member surrounding the charger cable at a point where it exits the handle, and that is secured by the two mating coupler halves.

11. The charging coupler of claim 9 wherein the housing comprises plastic coupler housing that has two mating halves that are configured to form the handle, and wherein the mating halves enclose the primary winding and the center magnetic core, and secures the charger cable in the handle.

12. The charging coupler of claim 6 wherein the center magnetic core is comprised of ferrite.

* * * * *